United States Patent
Ahmadi et al.

(10) Patent No.: US 8,493,243 B2
(45) Date of Patent: Jul. 23, 2013

(54) RADIO FREQUENCY IDENTIFICATION INTERFACE DEVICES AND METHODS

(75) Inventors: Homayoun Ahmadi, Markham (CA); Mohammadreza Soudmand-Asli, Markham (CA); Hassanali Namazi, Markham (CA)

(73) Assignee: Intelletto Technologies Inc. (CA)

( * ) Notice: Subject to any disclaimer, the term of this patent is extended or adjusted under 35 U.S.C. 154(b) by 166 days.

(21) Appl. No.: 12/818,282

(22) Filed: Jun. 18, 2010

(65) Prior Publication Data

US 2011/0309955 A1 Dec. 22, 2011

(51) Int. Cl.
*H03K 17/94* (2006.01)

(52) U.S. Cl.
USPC .......................................................... 341/22

(58) Field of Classification Search
USPC ............ 341/22; 340/10.1–10.6, 572.1–572.8, 340/11.1
See application file for complete search history.

(56) References Cited

U.S. PATENT DOCUMENTS

| | | | |
|---|---|---|---|
| 4,510,490 A | 4/1985 | Anderson, III et al. | |
| 5,280,159 A | 1/1994 | Schultz et al. | |
| 5,719,382 A | 2/1998 | White | |
| 5,726,388 A | 3/1998 | Ferland | |
| 5,777,884 A | 7/1998 | Belka et al. | |
| 5,809,142 A | 9/1998 | Hurta et al. | |
| 5,925,873 A | 7/1999 | Kumar | |
| 5,963,134 A | 10/1999 | Bowers et al. | |
| 6,078,251 A | 6/2000 | Landt et al. | |
| 6,415,978 B1 | 7/2002 | McAllister | |
| 6,448,886 B2 | 9/2002 | Garber et al. | |
| 6,693,539 B2 | 2/2004 | Bowers et al. | |
| 6,877,663 B2 | 4/2005 | Kelly et al. | |
| 7,207,488 B2 * | 4/2007 | Hammerslag et al. ........ 235/440 |
| 7,289,026 B2 | 10/2007 | Hackstadnt et al. | |
| 7,461,784 B2 | 12/2008 | Robkin et al. | |
| 7,669,766 B2 | 3/2010 | Ahmadi et al. | |
| 2002/0016739 A1 | 2/2002 | Ogasawara | |
| 2004/0113791 A1 | 6/2004 | Salim et al. | |
| 2004/0196143 A1 | 10/2004 | Crump et al. | |
| 2006/0109122 A1 | 5/2006 | Deeds | |
| 2006/0213989 A1 | 9/2006 | Ahmadi et al. | |

FOREIGN PATENT DOCUMENTS

WO WO-2005/106814 11/2005

OTHER PUBLICATIONS

"International Application No. PCT/US2005/014045, International Preliminary Report on Patentability dated Jul. 10, 2007, and Written Opinion dated May 11, 2007", 4 pgs.

"Product description of pcPROX USB RFID Reader", www.trossenrobotics.com/pcprox-usb-rfid-reader.aspx [retrieved Jun. 7, 2010], (Jun. 7, 2010), 4 pgs.

(Continued)

*Primary Examiner* — Robert Pascal
*Assistant Examiner* — Khiem Nguyen
(74) *Attorney, Agent, or Firm* — Schwegman Lundberg & Woessner, P.A.

(57) ABSTRACT

A radio frequency identification (RFID) device is described. In one implementation, there is provided a keyboard emulator; a first keyboard interface configured to receive an operative connection to a host computer, and operatively connected to the keyboard emulator; and a controller configured to receive data from at least one RFID tag; and transfer the data through the keyboard emulator and then the first keyboard interface in response to a user-initiated route instruction received by the controller, wherein the keyboard emulator converts the data to corresponding keystroke codes.

14 Claims, 11 Drawing Sheets

OTHER PUBLICATIONS

"Product description of Prox'N'Roll RFID Scanner, Zero Installation RFID reader (keyboard emulation", www.springcard.com/products/proxnroll-rfid-scan.html [retrieved Jun. 7, 2010], (Jun. 7, 2010), 2 pgs.

"Product description of Proximity Reader, StrongLink SL101", www.stronglink.cn [retrieved Jun. 7, 2010], (Jun. 7, 2010), 1 pg.

"Product description of RFID Reader SL 101", www.stronglink.cn/english/sl1101.htm [retrieved Jun. 7, 2010], (Jun. 7, 2010), 1 pg.

* cited by examiner

RADIO FREQUENCY IDENTIFICATION INTERFACE DEVICES AND METHODS

TECHNICAL FIELD

The present disclosure relates generally to the field of radio frequency identification (RFID) devices, and more particularly to the field of RFID devices that transfer RFID data.

BACKGROUND

Various industries have started to implement RFID systems. RFID allows for the scanning of multiple items simultaneously. Items can be scanned without line of sight and in any orientation, unlike barcodes which require a specific barcode alignment in order to be scanned.

One approach is to install software applications on a host computer to handle communication with an RFID reader.

Another approach is to install RFID control software on the host computer that will manage, manipulate and transfer RFID information from the RFID reader to the host computer's keyboard buffer when the proper input fields are in active focus. This approach can require control software to be installed on every user computer in the system, and can also require a user to coordinate multiple software screens.

Alternative methods and devices for utilizing RFID information are desirable.

BRIEF DESCRIPTION OF THE DRAWINGS

Implementations will now be described, by way of example only, with reference to the attached drawings, wherein:

Like reference numerals are used throughout the FIGS. to denote similar elements and features.

In FIGS. 5A, 5B, 5C and 6-8, conditional or decision steps are represented by rhombuses. Branches exiting the rhombuses labelled "Y" represent "yes" or positive responses, while branches exiting the rhombuses without labels represent "no" or negative responses.

DETAILED DESCRIPTION OF EXAMPLE IMPLEMENTATIONS

The present disclosure describes example devices and methods that can be utilized to provide RFID information to a host computer without installing any specialized software on the host computer.

In accordance with one aspect of the present disclosure, there is provided an implementation of a device comprising a keyboard emulator; a first keyboard interface configured to receive an operative connection to a host computer, and operatively connected to the keyboard emulator; and a controller configured to receive data from at least one RFID tag; and transfer the data through the keyboard emulator and then the first keyboard interface in response to a user-initiated route instruction received by the controller, wherein the keyboard emulator converts the data to corresponding keystroke codes.

In accordance with another aspect of the present disclosure, there is provided a method of transferring radio frequency identification (RFID) data using a device, the method comprising receiving data from at least one RFID tag to the device; and transferring the data through a keyboard emulator and then a first keyboard interface in response to a user-initiated route instruction, wherein the keyboard emulator converts the data to corresponding keystroke codes.

Figure 1:
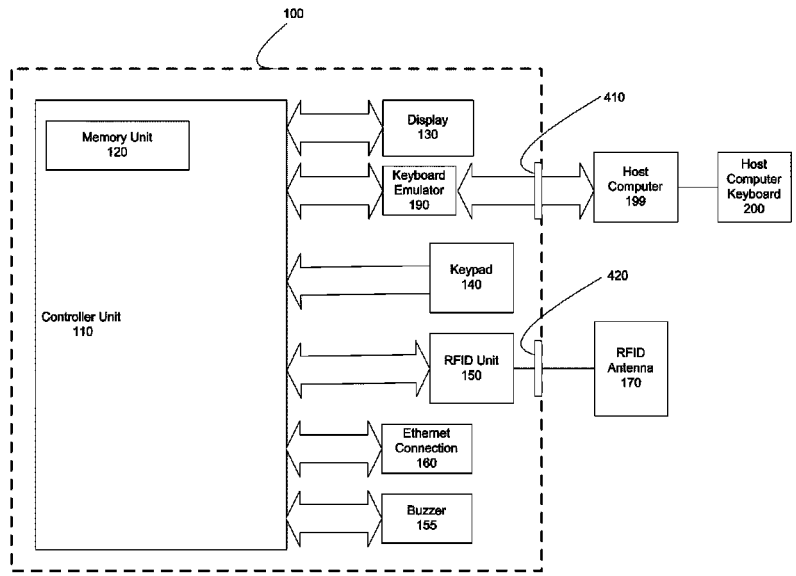
FIG. 1 is a block diagram illustrating example implementations of an RFID interface device connected to a host computer and an RFID antenna.

Referring to FIG. 1, the RFID interface device 100 provides an interface between RFID components, such as RFID unit 150 and RFID antenna 170, and a host computer 199 with associated user input devices, such as keyboard 200. In some implementations, RFID components can be internal to or external to the RFID interface device 100.

The RFID interface device 100 includes a controller unit 110 which controls the overall operation of the device 100. The controller unit 110 includes a hardware processor or other logic circuitry to control the device 100 and to perform other operations described herein. For example, the controller unit 110 could be a Rabbit 4000 series microprocessor provided under the trademark Rabbit 4000 series or a RCM 4200 family microprocessor core module such as a module provided under the trademark RCM 4210 by Rabbit of Davis, Calif. The controller unit 110 has a memory unit 120 which can comprise any combination of memory modules for storing instruction code which when executed by the controller unit 110 causes the controller unit 110 to control the RFID interface device 100 in accordance with one or more of the methods described herein. Such methods can include those in the flowcharts herein and the accompanying text. The memory modules also store RFID data. The types of memory can include flash memory, random access memory (RAM), read only memory (ROM), hard disk drives and the like. At least a portion of the memory unit 120 can include read-write memory for storing RFID data. In some implementations, the memory unit 120 can be external to the controller unit 110.

In other implementations, the controller unit 110 can comprise an electrically erasable programmable read-only memory (EEPROM) or a field-programmable gate array (FPGA) which may be configured to implement the modules and/or methods described herein. Removable memory can also be used, such as flash memory cards. Instruction code stored in persistent rewriteable non-removable memory is often referred to as "firmware" and that term may be utilized herein.

The controller unit 110 interacts with additional subsystems which in some implementations can include for example a display 130, a user input interface such as a keypad 140, an RFID unit 150, an audible output interface such as a buzzer 155 and a network interface such as an Ethernet connection 160. The display 130 can be any display device that can visually present basic information to a user such as the number of RFID tags being detected or the current mode of operation. In order to keep costs and size of the device down, the display 130 can be selected to display only a single digit representing a number of books (less than ten) on the antenna 170. The number of books could also be output through the audible output interface, for example as a series of beeps or other audible indications of a read RFID tag. As a further example, a read book or the total number of books could be spoken through a speaker, not shown, using a text-to-speech interface. The display 130 can be, for example, a liquid crystal display (LCD), a light-emitting diode (LED) display, a touch-screen, or the like. The display 130 can also comprise a series of lights or LEDs which when illuminated in various combinations visibly convey information to a user. In other implementations, the display 130 may display a subset or all of the data received from the detected RFID tags.

The keypad 140 may comprise one or more buttons on the outside of the device casing for receiving input from the user. In some implementations, the keypad may comprise a standard keyboard, such as a QWERTY keyboard, or a subset of keys found on a standard keyboard. In other implementations, the keypad 140 may be provided by a second keyboard interface for connecting an external keypad directly to the RFID interface device 100.

The RFID unit 150 controls an RFID antenna 170, scans for RFID tags and converts received radio waves from the RFID antenna 170 into RFID data for storage or processing by the controller unit 110. The RFID antenna 170 can send and receive radio waves to scan for RFID tags and to read data from the RFID tags and write data to RFID tags. In some implementations, the RFID unit 150 may be a distinct hardware or hardware and software module from the controller unit 110 as illustrated in FIG. 1. For example, the RFID unit could be a unit such as that sold under the trademark MHF-1 Reader Module by Intelletto of Markham, Ontario. In other implementations, the RFID unit 150 may be an embedded hardware or hardware and software module within the controller unit 110.

In the example implementation in FIG. 1, the RFID antenna 170 is external to the RFID interface device 100. In this implementation, the RFID antenna 170 may connect to the RFID unit 150 via an RF (radio frequency) coaxial cable with RF connectors, such as a SubMiniature version A (SMA) connector, on the device casing. The antenna 170 can have any configuration suitable for receiving RFID signals from RFID tags and sending RFID signals to RFID tags affixed to books and other items. The casing of the antenna can have a flat surface on which items to be scanned may be placed. An example antenna that can be used is an antenna provided under the trademark ANTH100-xx or ANTH2 by Intelletto of Markham, Ontario.

Figures 2, 3:
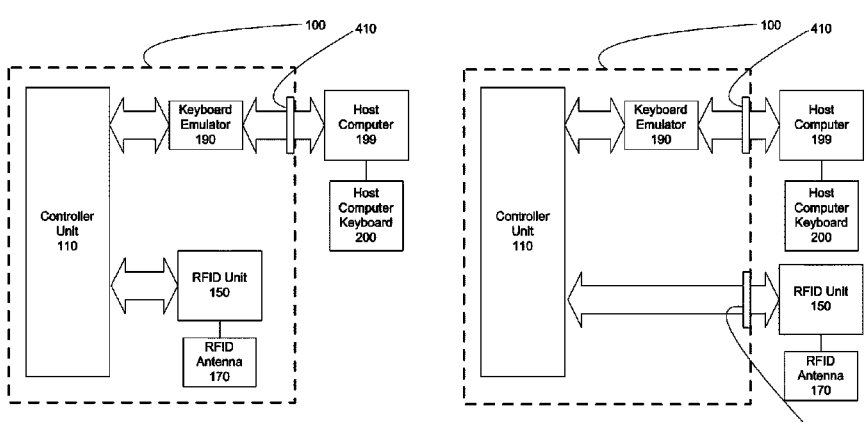
FIGS. 2 and 3 are block diagrams illustrating different example implementations of an RFID interface device.

FIG. 2 shows another example implementation in which the RFID antenna 170 is internal to the device 100. FIG. 3 shows yet another example implementation in which both the RFID unit 150 and the RFID antenna 170 are external to the RFID interface device 100. In this implementation, the RFID unit 150 communicates with the RFID interface device 100 via a communication interface 151 such as a USB interface, a serial interface such as an RS-232 (Recommended Standard 232) or SPI (serial peripheral interface) connection, a wireless interface or the like. In implementations where the RFID unit 150 is internal to the RFID interface device 100, the RFID unit 150 can be a physical connection such as a bus, or it can be a logical connection between hardware or software modules.

In FIGS. 2 and 3, other components from FIG. 1 have been left out of the FIG. for ease of description; however, it is understood that the other components can be included in the device 100 of FIGS. 2 and 3.

An Ethernet connection 160 can provide an interface to a computer or other device to reconfigure or update firmware of the RFID interface device 100. This connection may be wired Ethernet connection or wireless connection such as Wi-Fi or Bluetooth®. In other implementations, the RFID interface device 100 firmware may be updated via a different data communication connection such as, for example, a serial connection, or a Universal Serial Bus (USB) connection.

Various subsystems of the RFID interface device 100 may communicate with the controller unit 110 via one or more communication protocols. The controller unit 110 may generate component-specific commands, decipher component inputs or implement different communication protocols to send and receive messages from the connected components. For example, the controller unit 110 may interpret inputs from a keypad 140, implement TCP/IP (Transmission Control Protocol/Internet Protocol) over an Ethernet connection 160, or exchange commands and data with an RFID unit 150.

The RFID interface device 100 also comprises a keyboard emulator 190 which identifies the RFID interface device 100 as a keyboard device to a host computer 199. Most computers running common operating systems including Microsoft Windows®, Mac OS, Unix, and Linux have built-in software or drivers to automatically recognize and communicate with generic keyboard devices. When the RFID interface device 100 is connected to a host computer 199 running such an operating system, the host computer starts an initialization sequence wherein the keyboard emulator 190 identifies itself to the host computer 199 as a keyboard device. Upon recognizing the connected RFID interface device 100 as a keyboard device, the host computer 199 will begin communicating with the RFID interface device 100 in the same manner as any standard keyboard. In this manner, the keyboard emulator 190 allows the RFID interface device 100 to be automatically recognized and to communicate with the host computer 199 without requiring the user to install any specialized software such as device-specific drivers, applications or other control software to communicate with the RFID interface device 100.

On some computers 199, keyboard and/or basic USB support may be built into the computer's basic input/output system (BIOS) or boot firmware. In this situation, the RFID interface device 100 may be recognized as a keyboard independent of the host computer's operating system.

In some implementations, the RFID interface device may be automatically recognized as a Human Interface Device (HID) keyboard that complies with the USB-HID specification or other similar standard.

After the RFID interface device 100 is recognized as a keyboard, the controller unit 110 can send RFID information to the host computer 199 via the keyboard emulator 190. From the perspective of the host computer 199, the information received from the RFID interface device 100 is the same as information manually typed into a computer keyboard. The host computer 199 may also send keyboard specific signals to the keyboard emulator 190 as described further herein.

The keyboard emulator 190 may be a hardware emulator or a software emulator, and may be a separate module from the controller unit 110 or may be implemented as instruction code or logic circuitry built into the controller unit 110. For example, the keyboard emulator 190 could be an emulator sold under the trademark AT90USB16 by Atmel of San Jose, Calif., an emulator sold under the trademark Silicon Laboratories CP2101 by Silicon Laboratories of Austin, Tex., an emulator sold under the trademark Cypress CY7C638 by Cypress Semiconductor Corporation of San Jose, Calif., or an emulator sold under the trademark Prolific PL-2303X by Prolific of Taipei, Taiwan.

The keyboard emulator 190 may be connected to the host computer 199 through a keyboard interface 40 by any connection which provides an operative connection allowing the RFID interface device 100 to be recognized as a keyboard device by the host computer 199. Types of suitable interfaces include but are not limited to USB connections, PS/2 or serial connections, and wireless connections including Bluetooth®, infrared, and radio frequency (RF) connections. The keyboard emulator 190 may communicate over these connections using a corresponding keyboard protocol such as a USB Human Interface Device (HID) protocol, a PS/2 keyboard protocol, a Bluetooth® protocol or any other protocol or communication means which allows the RFID interface device 100 to be recognized as a keyboard device by the host computer 199.

The keyboard interface 410 is operatively connected to the keyboard emulator 190. This connection may be a logical connection or a physical connection such as an electrical wire or bus. In some implementations, the keyboard interface 410 is operatively connected to the keyboard emulator 190 through the controller unit 110 or through another module in the RFID interface device 100.

The keyboard emulator 190 communicates with the host computer 199 via the keyboard interface 410 by sending keystroke codes. These keystroke codes are standard codes recognized by computers to represent different character or function key inputs. In some cases, the keystroke codes are identical to a character's ASCII (American Standard Code for Information Interchange) code. In other cases, the host computer converts a received keystroke code into a corresponding ASCII code or other character-encoding scheme. In other cases, the host computer recognizes a keystroke code as a function or navigation key.

Figure 4A:
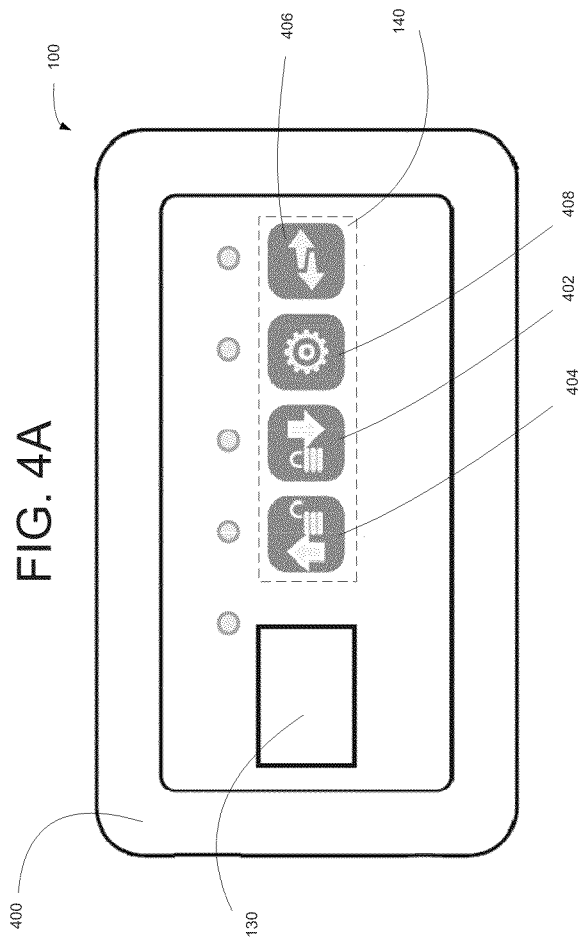
FIGS. 4A, 4B, and 4C are respectively top, side, and front elevation views of an example implementation of an RFID interface device.
Figure 4C:
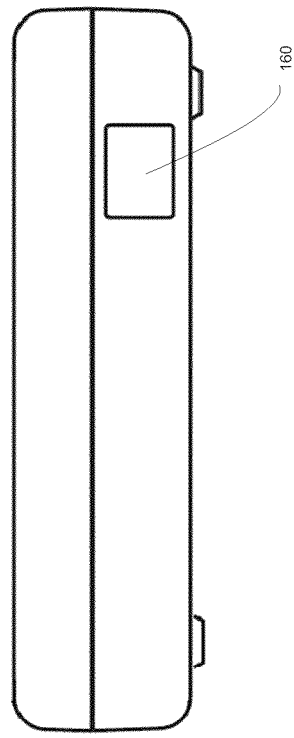
Figure 4B:
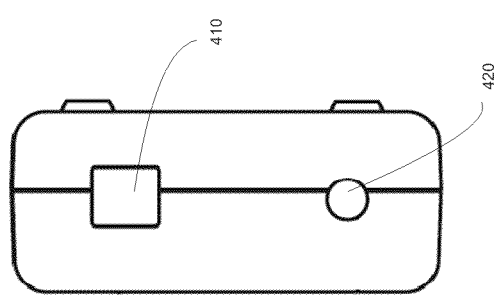

Referring to FIGS. 4A, 4B and 4C, the RFID interface device 100 can include a case housing the components of the device. The case can be formed, for example, from a rigid plastic. The device casing 400 houses internal components and has integrated therein a keypad 140, and Ethernet port 160, a keyboard interface port 410, and an RFID interface port 420.

In the following examples, the RFID interface device 100 will be discussed in the context of a library checkout system; however, the scope of the present disclosure is not limited to this context and can be applied to other applications.

In a standard library checkout system including software operating on the host computer 199, an operator typically presses a function key or a sequence of keystrokes on a keyboard to enter into a check-in or check-out mode. When checking in items, the operator may activate security features on the RFID tags on the items so that when any of the items pass near security scanners placed near library exits an alarm may be triggered. Likewise, when checking out items, the operator may deactivate the security features on the RFID tags, so that the items may pass the exit scanners without triggering an alarm.

In one implementation, the RFID reader 100 comprises a keypad 140 as illustrated in FIG. 4A. The keypad 140 can include, for example, a check-in key 402, a check-out key 404, a route key 406, a mode key 408 or any number of other keys. When a user presses the check-in key 402, the RFID interface device 100 sends a keystroke command to enter check-in mode. The keystroke can be an appropriate sequence of keystrokes to the connected host computer 199 required for the host computer 100 to enter a check-in mode. For example, if the library application requires the user to press the F5 key at a keyboard to enter a check-in mode (for example displaying a check-in screen display with input fields), the RFID interface device 100 can be configured to send the keystroke code associated with the F5 key to the host computer 199 when a user activates the check-in key 402 in the RFID interface device. Upon activation of the check-in key 402, the RFID interface device can also enter into a check-in mode in which the RFID unit 150 is configured to activate security features of RFID tags on library items as described below.

Similarly, when a user presses the check-out key 404, the RFID interface device 100 sends a keystroke command to enter check-out mode. The keystroke can be an appropriate sequence of keystrokes to the connected host computer 199 required for the host computer 100 to enter a check-out mode, and the RFID interface device enters a check-out mode in which the RFID unit is configured to deactivate security tags on the library items. For example, if the library application is configured to enter check-out mode (for example displaying a check-out screen display with input fields) when an F6 key is pressed then the RFID interface device 100 can be configured to send an F6 keystroke when a user activates the check-out key 404.

The route key 406 can be configured to initiate a route data process to send RFID tag information to the host computer 199 as discussed in the methods herein.

The mode key 408 may be configured to switch between different modes of operation such as different routing modes as described herein. Other keys can be configured to send other keystroke sequences, to change operating modes, or to perform any other specific actions when pressed.

Figure 5A:
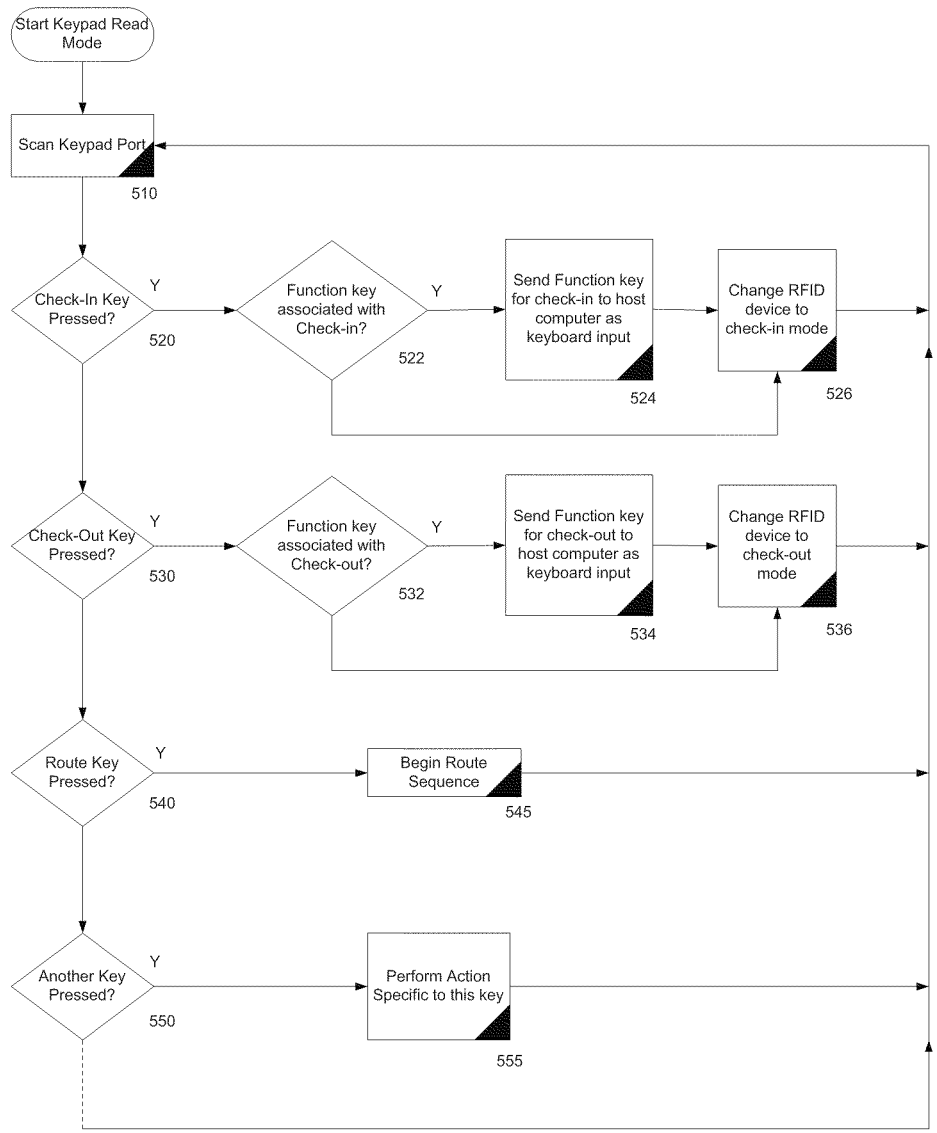
FIG. 5A is a flow diagram illustrating shows a flowchart illustrating the operation of an RFID interface device keypad.

FIG. 5A shows a flowchart illustrating the operation of the keypad 140. In step 510, the controller unit 110 scans a keypad port of the controller unit 110 to which keypad 140 is connected or waits for an interrupt signal signifying that a key has been pressed. If a check-in key has been pressed 520, and if there is a library application function key input associated with the check-in process 522, the RFID interface device 100 sends the associated key stroke command (in this case, the F5 function key) to the host computer 199 as a keyboard input 524. The RFID interface device 100 also moves into check-in mode to perform appropriate security functions if necessary 526.

If a check-out key 404 has been pressed 530, and if there is a library application function key input associated with the check-out process 532, the RFID interface device 100 sends a keystroke command (for example, the F6 function key) to the host computer 199 as a keyboard input 534. The RFID interface device also moves into check-out mode to perform the appropriate security functions if necessary 536.

If a route-key 406 has been pressed 540, the RFID interface device 100 initiates a route sequence 545 as described herein. If the keypad 140 has any other keys, pressing these keys 550 will trigger any action or sequence of actions associated with the pressed key 555. For example, a change mode key may be configured to toggle the RFID interface device 100 between a one-by-one routing mode and a route-at-once mode as described hereafter.

Figure 11:
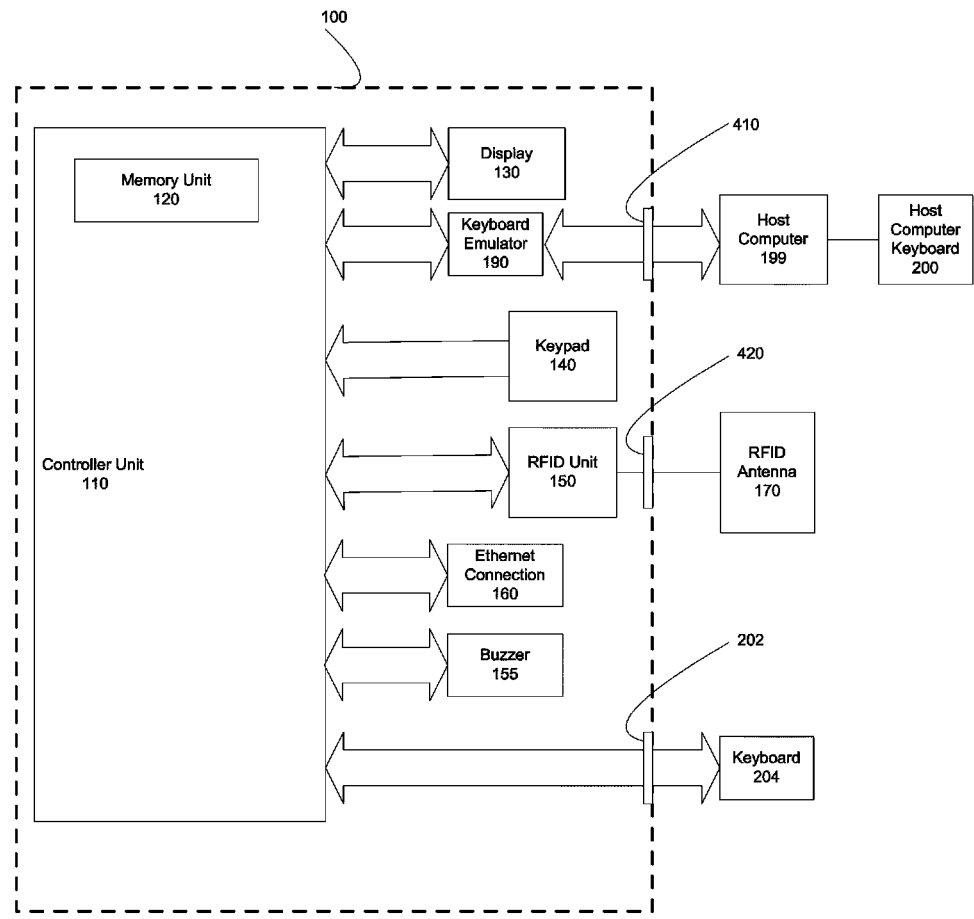
FIG. 11 is a block diagram of an example implementation of an RFID interface device including a keyboard interface for an external keyboard.

Referring to FIG. 11, the RFID interface device 100 may have an external keyboard interface 202 for directly connecting an external keyboard 204. The keyboard interface 202 can be similar to the interface 410. In these implementations, the RFID interface device 100 can forward keystrokes typed into the external keyboard to the connected host computer 199 through the keyboard emulator 190 such that the keyboard 204 can act as the keyboard 200 for general use with the host computer 199. When a predetermined key or combinations of keys is entered into the external keyboard 204, the RFID interface device 100 can interpret the key combination as a command and change modes or may transfer RFID data from scanned RFID tags to the host computer 199, for example, in a manner similar to activation of the keys 402-406.

In other implementations, the RFID interface device 100 may comprise a QWERTY keyboard to allow the RFID interface device 100 to function as both a regular keyboard and an RFID interface device.

In other implementations, the keypad 140 can, for example, be comprised of virtual buttons on a touchscreen. In these implementations, the touchscreen may act as both a display 130 as well as a keypad 140 to receive user input to change modes or trigger a route sequence.

In other implementations, the RFID interface device 100 can comprise one or more switches to receive user input to change modes or trigger a route sequence.

As can be seen, many implementations emphasizing the teaching herein are possible and the teachings are not limited to the specific implementations described herein.

Figure 5B:
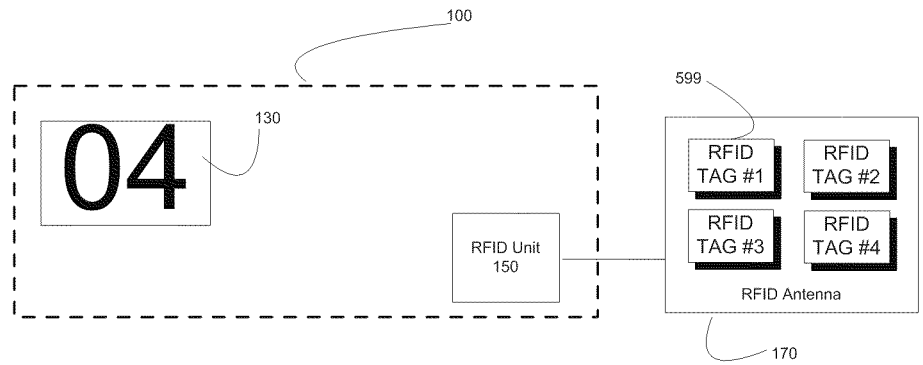
FIG. 5B is a block diagram illustrating the example implementation shown in FIG. 1 with four RFID tags placed on a connected RFID antenna.

Referring to FIG. 5B, a user has placed four library items with RFID tags 599 on the RFID antenna 170. The RFID interface device 100 has recognized that four RFID tags 599 are present, and the display 130 is displaying "04" to inform the user that four RFID tags are currently recognized.

Upon entering a check-out mode, a library checkout application running on a host computer 199 will typically wait for a user to enter the item number for a single article (book, compact disc, etc.) to be checked out. Legacy library systems based on barcodes require the user to enter item numbers one at a time and must be focused on an appropriate input field before item information may be entered.

The RFID interface device 100 scans RFID tags independently from any instruction from the host computer 199 and may scan multiple tags at once. Therefore, the RFID interface device 100 can be configured to transmit item information to the host computer 199 only when triggered by a predetermined event.

Figure 5C:
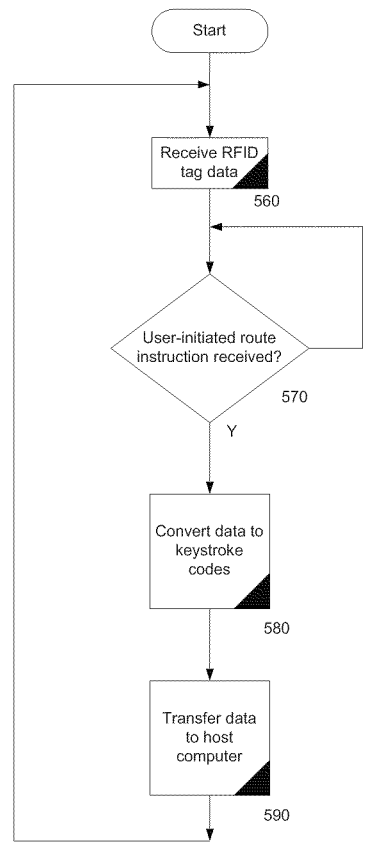
FIGS. 5C and 6-8 are flow diagrams illustrating example implementations of methods for operating an RFID interface device in response to the presence of RFID tags and to the activation of a route key by a user.

FIG. 5C shows a flow diagram of an example implementation wherein the predetermined event is a user-initiated route instruction. In step 560, the RFID interface device 100 receives RFID tag data through the RFID interface 420. When the controller unit 110 receives a user-initiated route instruction 570 (such as a route key press at 540 FIG. 5A), a route sequence is initiated wherein RFID tag data is converted to keystroke codes 580 by the keyboard emulator 190 before being transferred 590 to the host computer 199 (through interface 410).

In some implementations, the order of steps 560, 570 and 580 may be varied. For example, in one implementation, the controller unit 110 can be configured to receive RFID tag data 560 after receiving a user-initiated route instruction 570 and before converting the data to keystroke codes 580 and transferring the data to the host computer 590. In another example implementation, the controller unit 110 can be configured to receive RFID tag data 560 and to convert the RFID tag data to keystroke codes 580 before receiving a user-initiated route instruction 570 and subsequently transferring the data to the host computer 590.

Figure 5D:
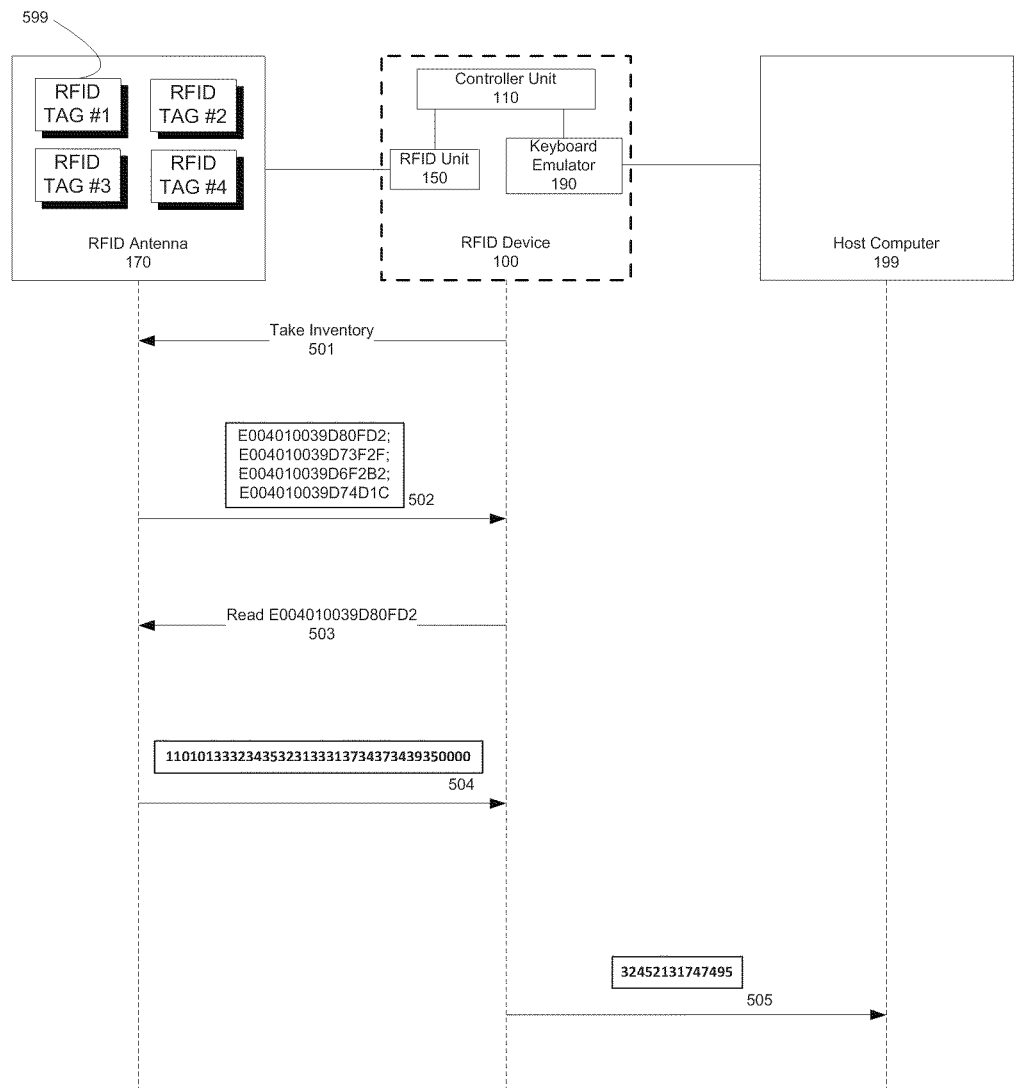
FIG. 5D is a flow diagram illustrating an example of receipt of how RFID data by an RFID interface device and transfer to a host computer.

FIG. 5D shows a flowchart illustrating an example of how RFID data can be received from an RFID tag 599, and transferred to a host computer 199. Four items with RFID tags 199 have been placed on an RFID antenna 170. The RFID antenna 170 is connected to an RFID unit 150 on an example implementation of an RFID interface device 100. A keyboard emulator 190 on the RFID interface device 100 is connected to a host computer 199.

In step 501, the controller unit 110 sends an inventory command) typical RFID command) to the RFID unit 150, which then sends radio signals over the RFID antenna 170 to scan for RFID tags 599. The RFID unit 150 detects, for example, four RFID tags 599 and returns the unique identifiers (UID) for each of the four tags 502 to the controller unit 110.

In step 503, the controller unit 110 sends a read command to the RFID unit 150 requesting data from the RFID tag 599 with the UID "E004010039D80FD2". The RFID unit 150 sends radio signals over the RFID antenna 170 to read the requested data from the specified RFID tag 599. The data on the RFID tags 599 can be additional or different information in other formats, as desired for particular implementations. In this example, the requested data is an item number associated with a library book to which the RFID tag 599 is affixed.

The RFID unit 150 reads and returns the RFID data "110101333234353231333137343739350000" 504 to the controller unit 110. Data stored on an RFID tag 599 may be encoded in a number of different ways depending on the system used to program the RFID tag 599. In some library systems, the first and/or last blocks of data may comprise a signature sequence to identify the coding mechanism or system to use when deciphering the data. In some implementations, the RFID interface device 100 can be configured to recognize and handle any number of different coding mechanisms. In the example data in step 504, the first "110101" and the last "0000" are part of the signature or encoding sequence and do not comprise part of the desired information. The remaining data "333234353231333137343734343935" is a hexadecimal representation of item number "32452131747495".

After deciphering the data, the controller unit 110 transfers 505 the item number or other data to the host computer 199 via the keyboard emulator 190. The keyboard emulator 190 converts the data to keystroke codes to be sent to the host computer 199. In some implementations, the controller unit 110 and keyboard emulator 190 can be configured to send additional function keys, tabs, carriage returns and line feeds or other keystroke codes as required by an application on the host computer, or as desired to further automate the application on the host computer.

Any combination of the aforementioned steps as well as the above steps in combination with other steps can be used to implement the methods described herein.

In accordance with one aspect of the present disclosure, the user-initiated route instruction can be a signal received from the host computer 199. The host computer 199 communicates with the RFID interface device 100 using the standard keyboard protocols inherent in the host computer's BIOS or operating system.

In most standard keyboard protocols, the host computer 199 can communicate with a connected keyboard 200 using a limited set of keyboard messages. Of these keyboard messages, the LED output report is one that is easily initiated by a user. The LED output report is a keyboard message indicating the current state of the "NUM LOCK", "CAPS LOCK" and "SCROLL LOCK". When one of these states is toggled, the host computer 199 broadcasts the LED output report to all keyboards that are connected to the host computer 199. Therefore, any time a user presses the NUM LOCK, SCROLL LOCK or CAPS LOCK key on any standard keyboard, the state associated with the lock key is toggled, and the host computer broadcasts an LED output report keyboard message to all connected keyboard devices. In addition to the three aforementioned lock keys, some keyboards have additional "KANA" or "COMPOSE" keys whose associated states may also be broadcast in an LED output report keyboard message. The NUM LOCK, SCROLL LOCK, CAPS LOCK, KANA and COMPOSE keys will be referred to hereafter as "lock keys".

In accordance with one aspect of the present disclosure, the RFID interface device 100 recognizes keyboard messages from the host computer 199. From the lock key state information in the LED output report messages, the RFID interface device 100 can determine which lock key has been pressed by a user.

In some implementations, a user-initiated route instruction can be signal created when a user presses a specific lock key on a keyboard 200 connected to the host computer 199. In other implementations, a user-initiated route instruction may be a signal created when a user presses any lock key. In other implementations, different lock keys may also trigger an enter check-in or check-out mode sequence similar to when a check-in key 404 or check-out key 402 on the keypad 140 is pressed.

In some implementations, a user-initiated route instruction can be a signal created when a user presses a route key button 406 on a keypad 140 of the RFID interface device 100, or when a predetermined number of RFID tags are detected by the RFID unit 150.

In one mode of operation, a route sequence sends item information stored as RFID data on a single RFID tag currently detected by the RFID unit 150. In another mode of operation, a route sequence sends item information for all RFID tags currently detected by the RFID unit 150. These modes of operation are illustrated in the flow diagrams in FIGS. 6, 7 and 8.

Figure 6:
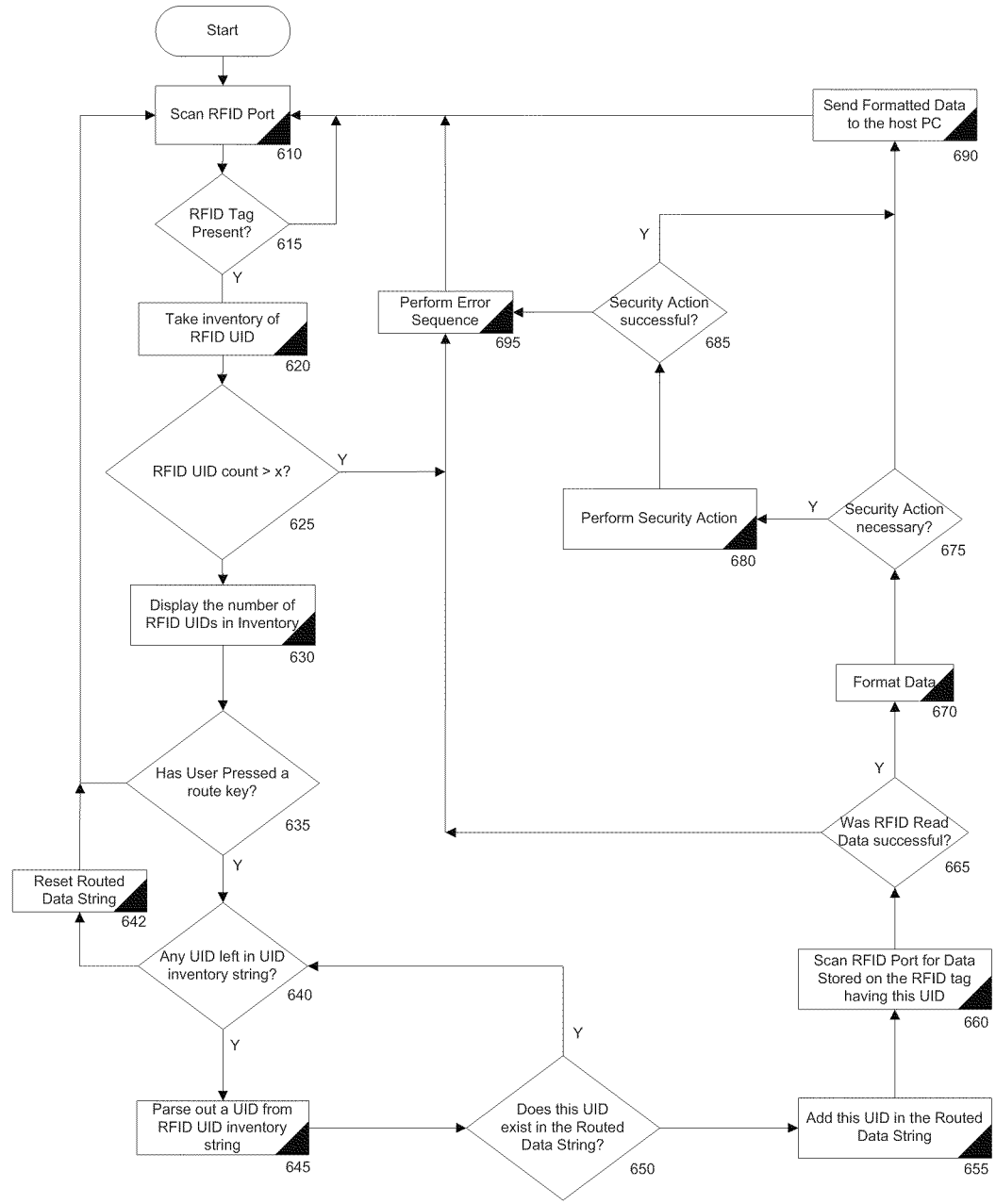

FIG. 6 shows a flow diagram of an example implementation wherein the RFID interface device 100 sends the information from a single RFID tag with each user-initiated route instruction. The RFID unit 150 sends RF signals through the RFID antenna 170 to scan for RFID tags 610. If one or more RFID tags are present 615, the RFID interface device 100 adds each RFID tag's UID to an inventory list 620.

If the number of UIDs in the inventory list exceeds a predetermined threshold 625, an error sequence 695 is performed. If the RFID interface device 100 has a display 130, the number of UIDs in the inventory list is displayed 630. The RFID unit 150 continues to scan for RFID tags, and updates the UID inventory list and the display 130 to show the number of RFID tags currently being detected.

When a user triggers a route sequence 635 by one of the methods described above, the RFID interface device 100 traverses the UID inventory list. The RFID interface device 100 maintains a routed data list which contains all the UIDs that are present and whose associated RFID tag's information has already been routed to the host computer 199. Each UID in the UID inventory list is parsed 645 to see if it already exists in the routed data list 650. If there are no unrouted UID's in the UID inventory list 640, the routed data string is reset 642 and an audible or visual signal may be generated to notify the user.

When an unrouted UID is found, the UID is added to the routed data list 655, and the data stored on the RFID tag associated with the UID is scanned 660. If the RFID unit 150 is unable to read the data on the RFID tag 665, an error sequence 695 is performed.

When RFID tag data is read, the RFID interface device 100 may format the data 670 into a format suitable, for example, for the library checkout application running on the host computer 199. This formatting may include inserting carriage returns, line feeds, function keys or any other key to streamline the checkout process. In this context, formatting may also include inserting delays between data transfers to the host computer 199 to allow slower legacy systems to properly receive the data.

Depending on the host application system, tags can utilize security features. For example a library article can have an Application Family Identifier (AFI) code in the RFID tag or an Electronic Article Surveillance (EAS) tag which can be used to trigger an alarm when the article improperly passes near detection units. These detection units are often placed near exits to deter theft. When an article has not been properly checked out, an AFI code in an RFID tag may be set which may be configured to trigger an alarm when detected. An EAS tag may be similarly configured to trigger an alarm.

If the library system uses such a security system 675, the RFID interface device 100 can be configured to deactivate or disable the AFI or EAS security of the tags when the article is being checked out, or to reactivate them when the article is being checked in 680. If this process is unsuccessful 685, an error sequence 695 may be executed. Whether the RFID interface device 100 is in a check-in or a check-out mode will determine if the security tags are reactivated or deactivated.

In the last step 690, the formatted RFID tag data is sent to the host computer 199 via the keyboard emulator 190.

If an error sequence is triggered 695 through any of the steps discussed above, the RFID interface device may notify the user by activating the buzzer 155 to beep, or by displaying an error message on the display 130. Different sequences of beeps or different display messages may be generated for different errors.

Figure 7:
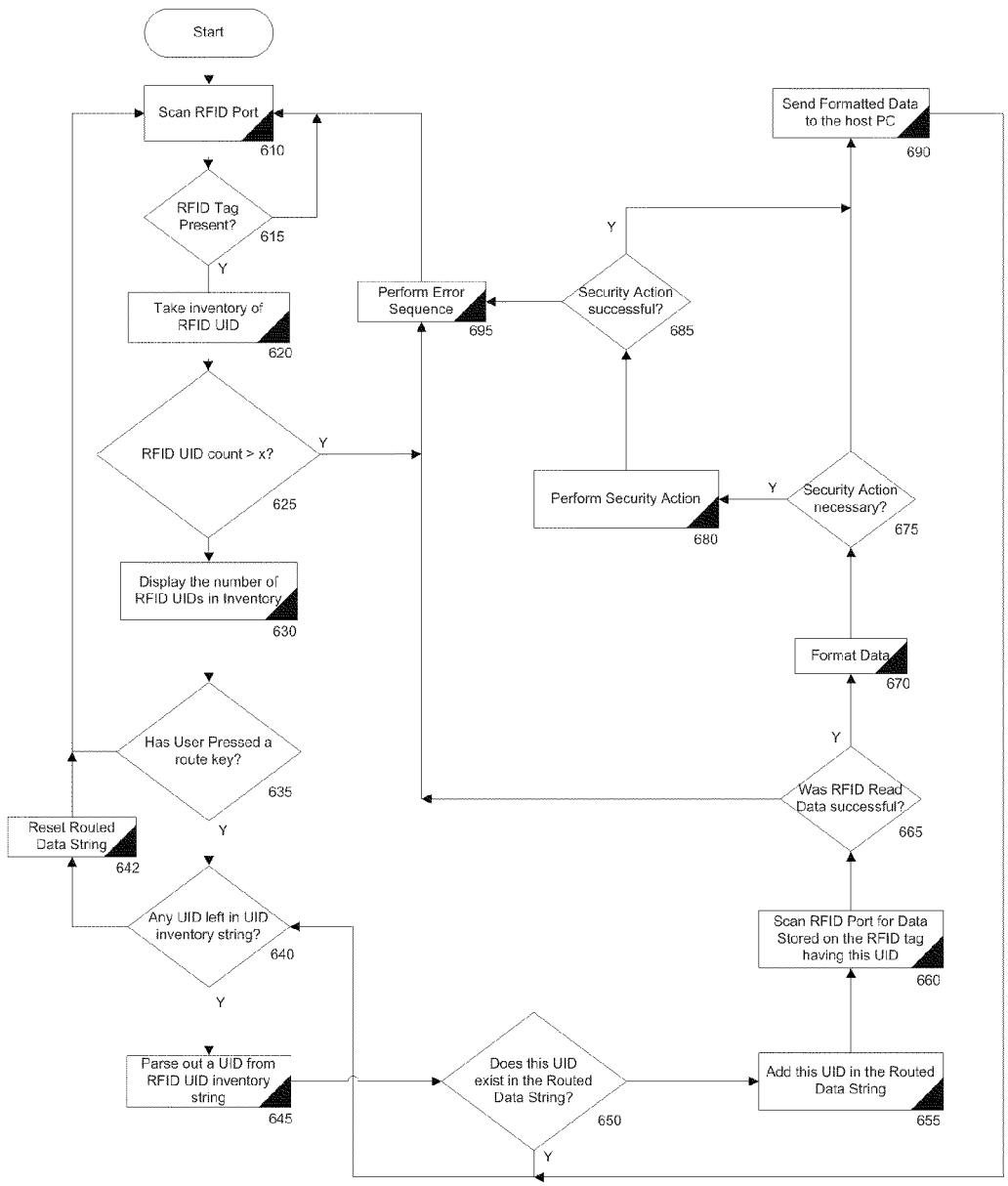

FIG. 7 shows a flow diagram wherein when a route trigger is received, the RFID interface device 100 is configured to sequentially send the information from all the RFID tags currently recognized by the RFID unit 150.

The mode of operation illustrated by FIG. 7 is very similar to that of FIG. 6 except that the after sending the formatted data 690 for the first RFID tag, the RFID interface device 100 is configured to continue parsing 645 through the UID inventory list until all of the UIDs have been processed and the associated RFID tag data has been sent to the host computer 199.

Figure 8:
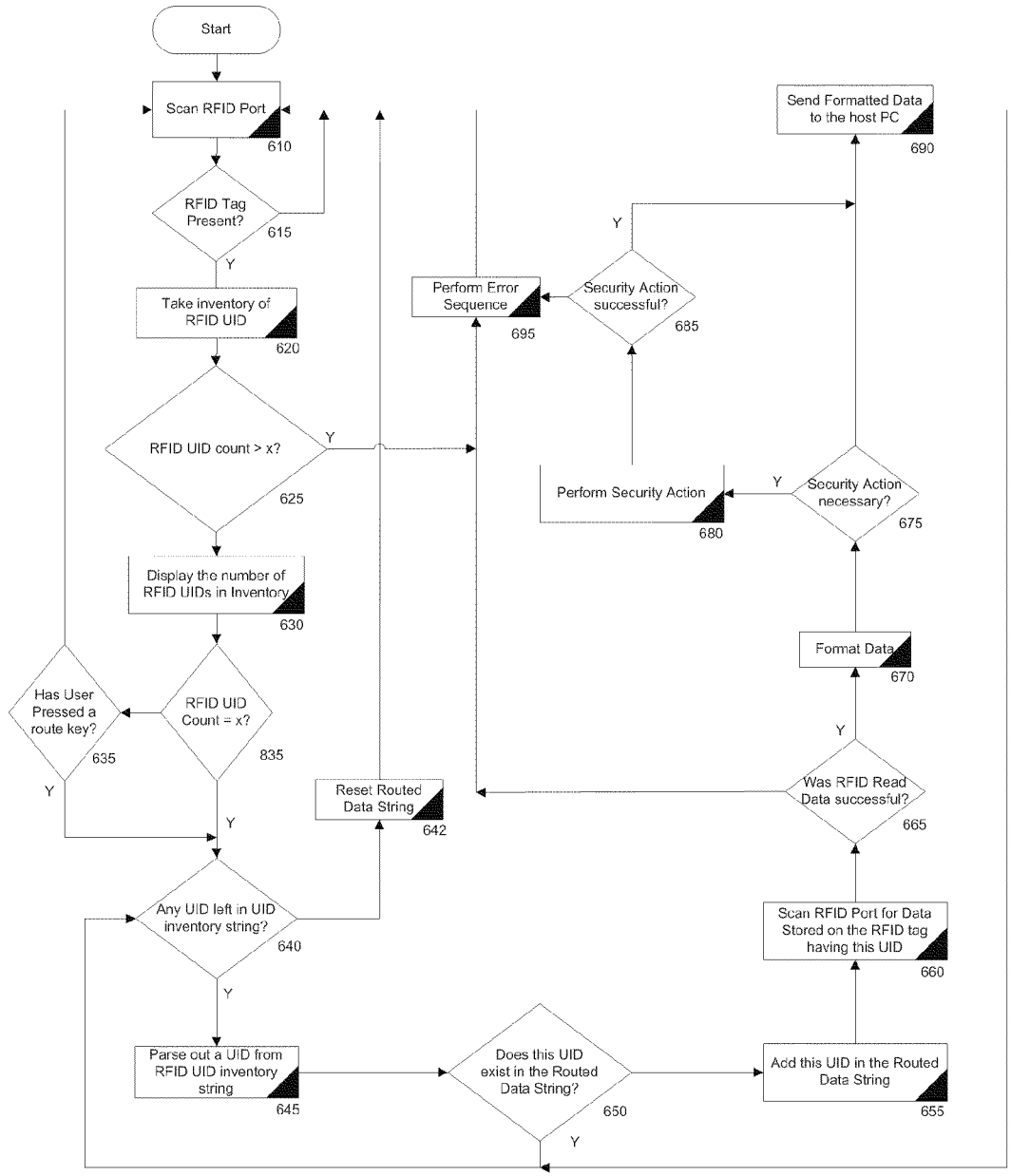

FIG. 8 shows a flow diagram wherein the RFID interface device 100 is configured to sequentially send data from all the RFID tags when the number of recognized RFID tags is equal to a predetermined number, or when the user presses a route key on a keyboard attached to the host computer 199 or on the RFID interface device keypad 140.

The mode of operation illustrated by FIG. 8 is very similar to that of FIG. 7 except that when the number of UIDs in the inventory list 835 equals a predetermined number x, the route sequence is automatically triggered without the user pressing a route key.

The one-by-one routing mode illustrated in FIG. 6 is suitable for library systems that process each item as it is scanned and require the user to immediately respond to any conflicts. Conflicts may include situations where the item being scanned is on hold and cannot be checked out, or when the item cannot be renewed. A library system suitable for use with the one-by-one routing mode is illustrated in FIG. 9.

Figure 9:
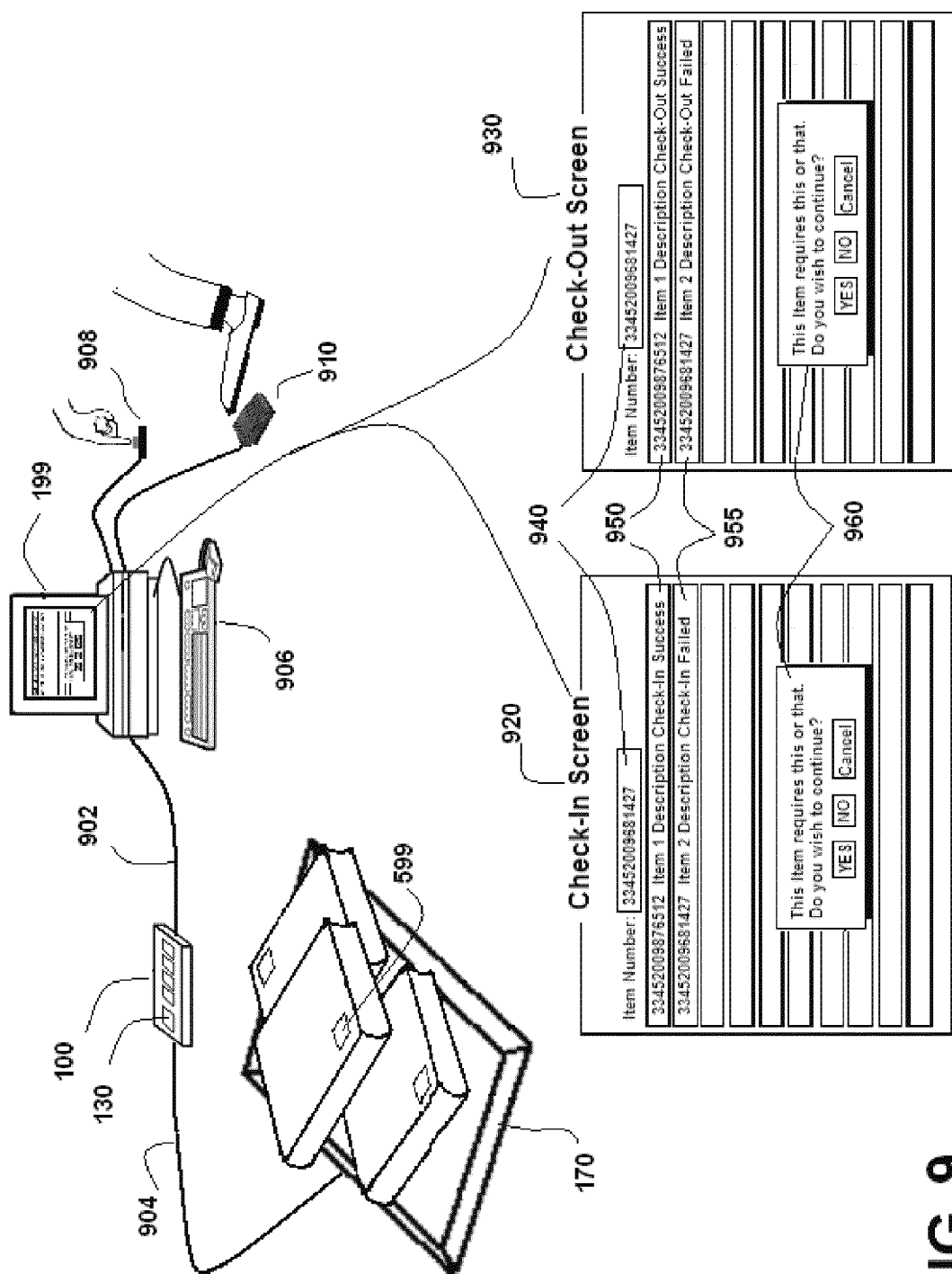
FIGS. 9 and 10 are example implementations of method configurations to which an RFID interface device and methods may be applied.

In FIG. 9, an example implementation of an RFID interface device 100 is connected to a host computer 199 via a USB cable 902. The RFID interface device 100 is connected to an RFID antenna 170 via an SMA cable 904. A user has placed three books with affixed RFID tags 599 on the antenna 170.

The host computer 199 has a keyboard 906 which can trigger the host computer 199 to send a keyboard message when a lock key is pressed as described herein. In some library systems, an external button 908 or foot pedal 910 may be connected to the computer and recognized as additional keyboard devices which may be configured to send lock key signals when they are activated.

Expanded Check-In screen 920 and Check-Out screen 930 of a library application in FIG. 9 illustrate sample screens which may appear on the host computer's screen when the library application is in the corresponding mode. In this situation, the user has placed three books on the antenna 170. With the RFID interface device 100 operating in one-by-one routing mode, the user has triggered a first route sequence which caused the RFID interface device 100 to enter "33452009876512", which was read from the first RFID tag 599, into the Item Number field 940. This item was successfully checked-in/out as indicated by the first entry line 950. The user has subsequently triggered a second route sequence which caused the RFID interface device 100 to enter "33452009681427", which was read from the second RFID tag 599, into the Item Number field 940. The library system determined that there is a problem with checking in/out item 33452009681427 causing a failed entry line 955 to appear and generating a pop-up window 960 requesting input from the user. The data for the third RFID tag is still in the queue and will not be sent to the host computer 199 until the user triggers a third route sequence. In this type of library system, sequentially sending RFID data to the computer 199 as in the route-at-once modes is not suitable because continuing to transmit RFID data after a pop-up window 960 appears may result in unintended responses to the pop-up or lost RFID data.

The two route-at-once modes illustrated in FIGS. 7 and 8 are suitable for library systems that allow a user to scan a number of items before responding to any conflicts. A library system suitable for use with the route-at-once modes is illustrated in FIG. 10.

Figure 10:
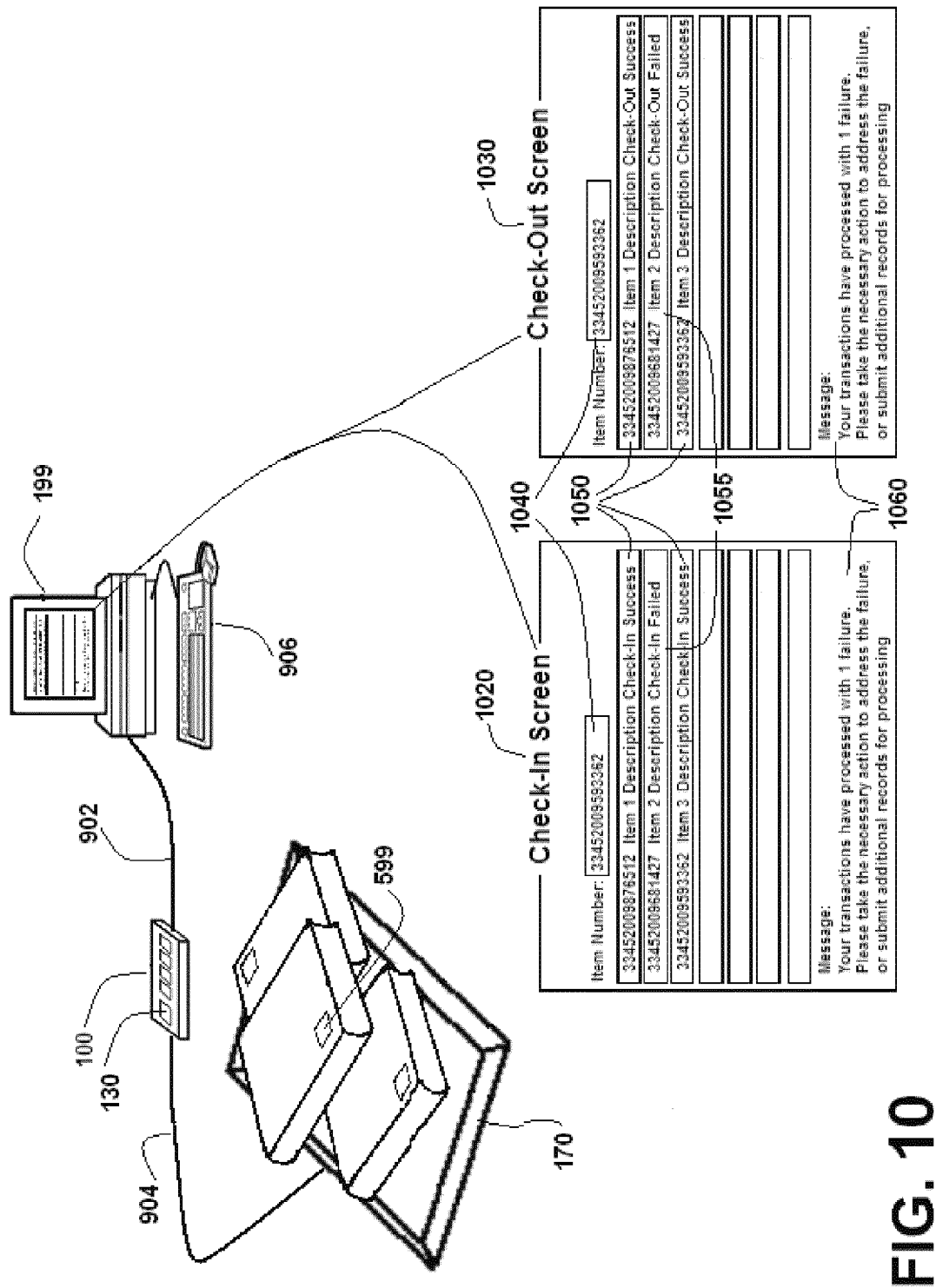

In FIG. 10, the hardware setup is the same as in FIG. 9 except for the absence of the optional external button 908 and foot pedal 910. The expanded Check-In 1020 and Check-Out 1030 screens in FIG. 10 illustrate sample screens which may appear on the host computer's screen when the library application is in the corresponding mode. A user has placed three books on the RFID antenna 170, and the RFID interface device 100 is operating in the route-at-once mode illustrated by FIG. 7. The user has triggered a route sequence by one of the methods described above, and the RFID interface device 100 has sequentially transmitted RFID data for each of the RFID tags 599 to the host computer 199. This data has been entered into the Item Number field 1040 one at a time and each item has generated an entry line 1050 to appear on the computer screen. In this library system, the application does not prevent the user from entering the item number for the third book despite there being a problem with the second book. Instead, the system indicates that there is a problem with the second book by generating a failed entry line 1055 and by generating a warning message at the bottom of the screen 1060 which can be addressed by the user after additional items have been processed.

The modes of operation discussed above are described by way of example and are not intended to limit the scope of the present disclosure.

In some implementations, the controller unit 110 is configured to operate in one or more of the modes described herein or in any other mode not specifically described. In some implementations, the controller unit 110 can be configured to switch between two or more modes of operation.

The above-described implementations of the present application are intended to be examples only. Alterations, modifications and variations may be effected to the particular implementations by those skilled in the art without departing from the scope of the application, which is defined by the claims appended hereto.

What is claimed is:

1. A device comprising:
a keyboard emulator;
a first keyboard interface configured to receive an operative connection to a host computer, and operatively connected to the keyboard emulator; and
a controller configured to
receive data from at least one RFID tag;
receive a keyboard message from the host computer via the first keyboard interface and recognize the keyboard message as a user-initiated route instruction; and
in response to the user-initiated route instruction, transfer the data from the RFID tag to the host computer through the keyboard emulator and first keyboard interface wherein the keyboard emulator converts the data to corresponding keystroke codes.

2. The device of claim 1 further comprising a second keyboard interface, and wherein the controller is configured to recognize a series of one or more keystrokes received via the second keyboard interface as a user-initiated route instruction received by the controller.

3. The device of claim 1 further comprising one or more user-operable inputs configured to initiate a route instruction to the controller upon actuation by a user.

4. The device of claim 3 wherein the one or more user-operable inputs are keys on the housing of the device.

5. The device of claim 1 wherein the first keyboard interface is a USB port, a PS/2 port, a serial interface, a TCP/IP port, or a wireless interface.

6. The device of claim 1 further comprising a display, and wherein the controller is further configured to convey on the display information pertaining to a quantity of detected RFID tags for which data has been received.

7. The device of claim 1 wherein the controller is configured to register the device as a keyboard device with the host device.

8. A method of transferring radio frequency identification (RFID) data using a device, the method comprising:
receiving data from at least one RFID tag to the device; and
transferring the data to a host computer through a keyboard emulator and then a first keyboard interface in response to a user-initiated route instruction received by the device through the first keyboard interface from the host computer, wherein the keyboard emulator converts the data to corresponding keystroke codes;
wherein the user-initiated route instruction is a keyboard message.

9. The method of claim 8 further comprising conveying information pertaining to a quantity of detected RFID tags for which data has been received.

10. The method of claim 8 further comprising transferring command keystrokes from the keyboard emulator through the first keyboard interface in response to a user-initiated route instruction.

11. The method of claim 8 wherein the user-initiated route instruction is initiated by an activation of a user-operable input.

12. The method of claim 8 wherein the user-initiated route instruction is initiated by receiving data for a predetermined quantity of RFID tags.

13. The method of claim 8 wherein the user-initiated route instruction is initiated by receipt of a series of one or more keystrokes.

14. The method of claim 8 wherein the keyboard emulator is registered as a keyboard device over the first keyboard interface.

* * * * *